United States Patent
McLemore et al.

(10) Patent No.: US 12,491,770 B2
(45) Date of Patent: Dec. 9, 2025

(54) REAL-TIME MASS ESTIMATION OF ELECTRIC VEHICLES

(71) Applicant: Hyroad Networks LLC, Austin, TX (US)

(72) Inventors: Neil McLemore, Phoenix, AZ (US); Varoujan Sarkissian, Scottsdale, AZ (US); Ashfaque B. Shafique, Chandler, AZ (US)

(73) Assignee: HYROAD NETWORKS LLC, Austin, TX (US)

( * ) Notice: Subject to any disclaimer, the term of this patent is extended or adjusted under 35 U.S.C. 154(b) by 108 days.

(21) Appl. No.: 18/333,721

(22) Filed: Jun. 13, 2023

(65) Prior Publication Data
US 2024/0001768 A1 Jan. 4, 2024

Related U.S. Application Data

(60) Provisional application No. 63/367,232, filed on Jun. 29, 2022.

(51) Int. Cl.
*B60L 3/12* (2006.01)

(52) U.S. Cl.
CPC .......... *B60L 3/12* (2013.01); *B60L 2240/463* (2013.01); *B60L 2250/26* (2013.01)

(58) Field of Classification Search
CPC .. B60L 3/12; B60L 2240/463; B60L 2250/26; B60L 2240/26; B60L 2260/44
See application file for complete search history.

(56) References Cited

U.S. PATENT DOCUMENTS

| | | |
|---|---|---|
| 5,369,591 A | 11/1994 | Broxmeyer |
| 2013/0231838 A1 | 9/2013 | Shiozawa et al. |
| 2014/0092249 A1 | 4/2014 | Freiburger |
| 2014/0330470 A1 | 11/2014 | Ozaki et al. |
| 2016/0153827 A1 | 6/2016 | Ham et al. |
| 2018/0201157 A1 | 7/2018 | Chen et al. |
| 2019/0250619 A1 | 8/2019 | Gillett |
| 2024/0042870 A1* | 2/2024 | Lugo-Castillo ........ G01G 19/03 |

FOREIGN PATENT DOCUMENTS

| | | | |
|---|---|---|---|
| WO | WO-2013075280 A1 * | 5/2013 | ........... G01G 19/086 |

OTHER PUBLICATIONS

ISA; International Search Report and Written Opinion dated Aug. 29, 2023 in PCT/US2023/025132.

* cited by examiner

*Primary Examiner* — Alan D Hutchinson
(74) *Attorney, Agent, or Firm* — SNELL & WILMER L.L.P.

(57) ABSTRACT

Connection and control concepts for real-time mass estimation of an electric vehicle are provided. The vehicle comprises a vehicle control module (VCM). Further, the vehicle comprises an inverter coupled to the VCM, and an electric motor coupled to the inverter. The electric motor is configured to measure the torque output from one or more wheels of the vehicle. The VCM is configured to receive the torque output measured by the electric motor and estimate mass of the vehicle based on the received torque output.

7 Claims, 3 Drawing Sheets

REAL-TIME MASS ESTIMATION OF ELECTRIC VEHICLES

CROSS-REFERENCE TO RELATED APPLICATION

This application claims priority to and the benefit of U.S. Provisional Patent Application No. 63/367,232 filed on Jun. 29, 2022 entitled "Real-time Mass Estimation of Electric Vehicles." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to mass estimation of vehicles using system-identification techniques.

BACKGROUND

Federal and state regulations may limit the amount of weight that medium- and/or heavy-duty vehicles may carry. Conventionally, weigh stations, air suspension systems, and tire pressure monitor systems are used to estimate mass of these vehicles. However, these systems are not built to provide accurate data measurements of the mass in real time, specifically when the vehicle is in motion. Further, braking systems in medium- and/or heavy-duty electric vehicles may be affected by varying mass. Accordingly, there is a need in the industry for mass estimation systems that provide estimation of the mass of the vehicle in real time.

SUMMARY

Embodiments described herein provide systems and methods for real-time mass estimation of electric vehicles. In an exemplary embodiment, a vehicle comprises a vehicle control module (VCM); an inverter coupled to the VCM; and an electric motor coupled to the inverter. The electric motor is configured to measure a torque output from one or more wheels of the vehicle, and the VCM is configured to receive the torque output measured by the electric motor and estimate a mass of the vehicle based on the received torque output.

In another exemplary embodiment, a method of estimating the mass of an electric vehicle (EV) comprises receiving a torque output of one or more wheels of the EV from an electric motor of the EV; determining if the EV is in motion; and estimating a mass of the EV based on the torque output received from the electric motor. When the EV is not in motion, the mass is estimated at a point of breakaway based on the torque output at the point of breakaway. When the EV is in motion, the mass is estimated using a system identification approach based on the torque output received from the electric motor of the EV.

In another exemplary embodiment, a non-transitory computer-readable medium has stored thereon instructions that, when executed by one or more processors of a computing device, cause the computing device to perform functions comprising: receiving a torque output of one or more wheels of an electric vehicle (EV) from an electric motor of the EV; determining if the EV is in motion; and estimating a mass of the EV based on torque output received from the electric motor. When the EV is not in motion, the mass is estimated at a point of breakaway based on the torque output at the point of breakaway. When the EV is in motion, the mass is estimated using a system identification approach based on the torque output received from the electric motor of the EV by at least one of: (i) utilizing a pedal input from a user over a persistency of excitation (PE) time period; or (ii) injecting a predesigned input into a mass estimation system of the EV.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
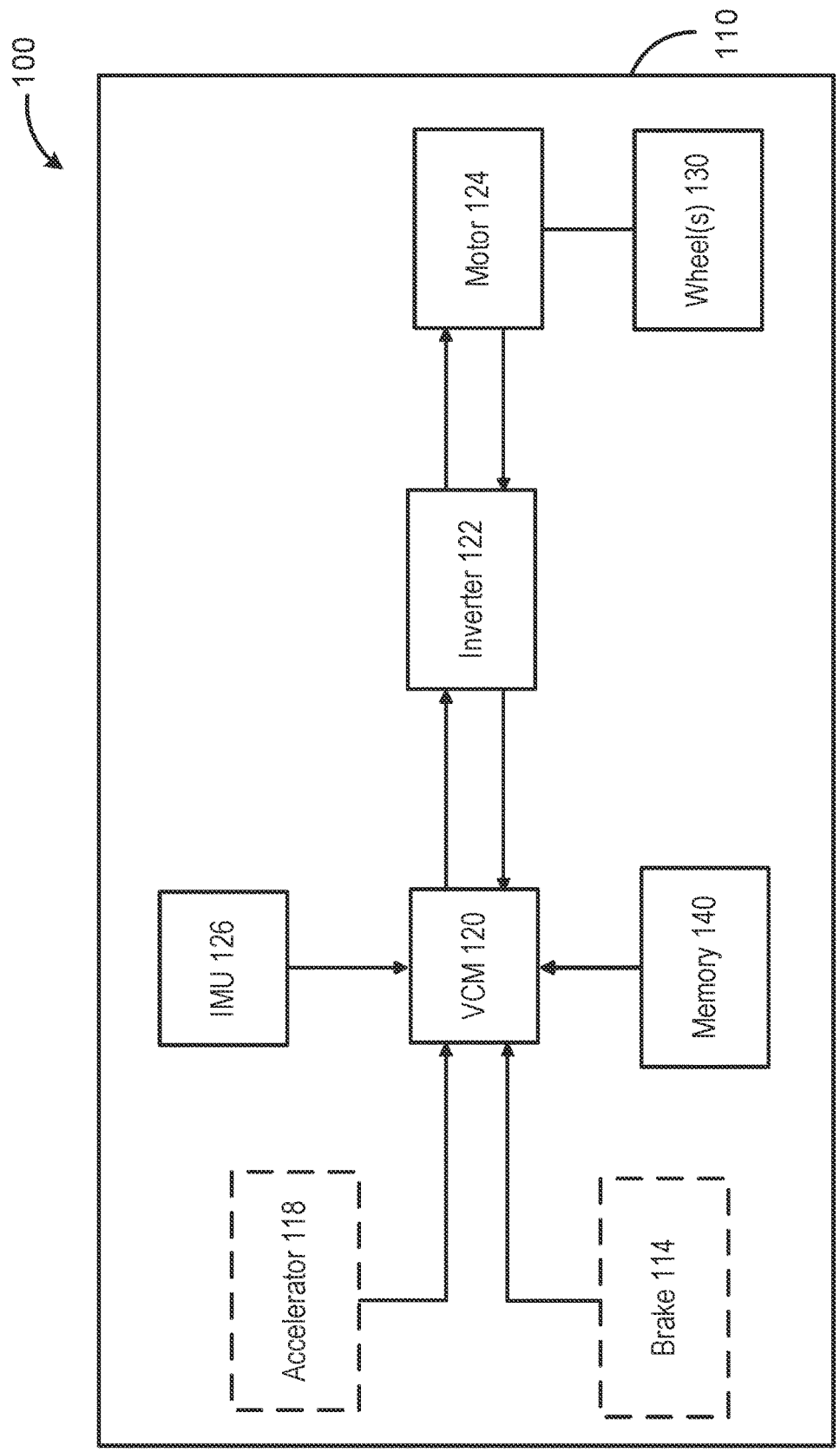
FIG. 1 illustrates a mass estimation system for an electric vehicle.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and/or mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery, fuel cell, and/or electrical, thermal, or other control or management system of the same. As such, numerous applications of the present disclosure may be realized.

In its simplest form, Newton's first law describes F=ma, where F is the force applied, m is the mass of the object and a is the acceleration in the direction of the force. For vehicles, this equation can be written such that $F_T=ma-F_f-F_{incline}$, where $F_T$ is the traction force from the engine/motor on to the vehicle in the direction of motion, $F_f$ is a generalization of the sum of various losses in traction force due to varying types of friction (for example, friction with the ground, air resistance, friction loss in powertrain, rolling friction, etc.) and $F_{incline}$ is the component of weight of the vehicle, which is also a force, in the same plane of travel as the vehicle. When the vehicle is traveling uphill, this force $F_{incline}$ is opposite from the direction in which the vehicle is traveling. When the vehicle is traveling downhill, this force $F_{incline}$ is in the same direction as the one in which the vehicle is traveling.

Conventional mass estimation systems solve for mass of the vehicle using some form of this equation. Conventional vehicles using such systems go through controlled acceleration or deceleration to measure the acceleration accurately over a sufficiently safe stretch of road or highway. However, computing acceleration from differentiation of vehicle speed can be noisy. Additionally, obtaining estimates of wind resistance, power resistance losses, and rolling resistance of a vehicle under significantly varying weather and vehicle configuration while the vehicle is in operation may be difficult, and the results potentially unreliable.

Further, some conventional mass estimation systems use estimates of pressure changes of tires to estimate the mass of the vehicle. Similarly, many commercial trucks employ an air suspension system, and measurements of the pressure in the air suspension can be used for mass estimation. However, these conventional systems and methods do not provide real time and accurate data of tire pressure and temperature but rather an approximate average so that the user can be alerted if a safety threshold is breached, and action is needed to prevent tires from going through catastrophic failure. Similarly, the pressure sensors in air suspension systems are utilized to determine leaks in the system but may not be reliable to estimate mass of a vehicle in real-time, specifically, when the vehicle is in motion.

Even further, the operation of electronic braking systems (EBS) in electric vehicles are affected by the mass of the vehicle. In automotive vehicles, the mass of the vehicle affects the EBS performance and stability control systems. In conventional light-duty vehicles, such as passenger cars, the mass often varies between five percent and twenty percent. However, in a heavy-duty vehicle, the mass of the vehicle can vary substantially, for example up to about 300 percent. Accordingly, accurate real-time estimation of mass of a heavy-duty vehicle is beneficial for smoother implementation of EBS, stability control, and regeneration braking in electric vehicles.

With reference now to FIG. 1, illustrated is a block diagram for a mass estimation system 110 of vehicle 100. In various examples, vehicle 100 is an electric vehicle incorporating an electric powertrain. More specifically, vehicle 100 is an electric commercial vehicle, such as, for example, a class 7 or a class 8 heavy-duty commercial vehicle. While described herein as a battery electric vehicle, vehicle 100 is not limited in this regard and may comprise any suitable type, size, or function of vehicle. For example, vehicle 100 may comprise a fuel cell electric vehicle, CNG vehicle, hythane vehicle, or any other suitable vehicle configured with torque sensing ability. Moreover, vehicle 100 may comprise a commercial vehicle of a different weight class (including light and/or medium duty commercial vehicles) or a passenger vehicle in various embodiments. It should be appreciated that vehicle 100 may comprise any vehicle type for which the mass estimation system discussed in further detail below may be beneficial.

In an exemplary embodiment, mass estimation system 110 comprises a vehicle control module (VCM) 120, which is responsible for the management and control of various vehicle components of vehicle 100. More specifically, VCM 110 is responsible for communication with one or more control units of vehicle 100 and may receive and transmit signals to and from various electronic control units (ECU) and/or other components of vehicle 100. As described herein, in exemplary embodiments, VCM 120 may be any control module of the vehicle including, but not limited to, one or more of a body control module (BCM), powertrain control module (PCM), or the like.

Mass estimation system 110 further includes at least one inverter 122 coupled to the VCM, and at least one electric motor 124 coupled to inverter 122. Inverter 122 is configured to convert the direct current (DC) received from one or more batteries of vehicle 100 to alternating current (AC) to power electric motor 124. Specifically, inverter 122 converts the DC current received from one or more batteries into multiple phase AC current that is fed to electric motor 124. The effect of rotating magnetic fields created by this multiphase AC current allows electric motor 124 to produce a rotating torque that translates to motion of the rotor, which may be mechanically coupled to one or more wheels 130.

Mass estimation system 110 also includes a memory 140. Memory 140 may be coupled to VCM 120 and may send or receive information from VCM 120. Further, memory 140 may be configured to store information received from VCM 120 or other control units of vehicle 100. Memory 140 may desirably be fault-tolerant, configured with error-correcting components, and/or otherwise configured to secure and maintain the integrity and reliability of information stored therein. In exemplary embodiments, memory 140 is comprised within VCM 120.

Additionally, in exemplary embodiments, VCM 120 may be coupled to a braking component 114. Braking component 114 may include conventional mechanical brakes, regenerative braking components, or any other type of electronic braking system (EBS).

Stationary Vehicle

When vehicle 100 is stationary on level ground, a certain amount of static friction may prevent vehicle 100 from moving until sufficient tractive force is applied using accelerator 118, which is coupled to VCM 120. This static friction arises from the normal force $F_N$ on the road surface and is further scaled by the static friction coefficient $\mu_s$. Normal force $F_N$ depends on the mass m of vehicle 100 and gravitational acceleration g (9.81 m/s²). Thus, $F_N=mg$. The static friction force $F_{SF}$ is the normal force $F_N$ scaled by the static friction coefficient $\mu_s$. Thus, vehicle 100 requires at least the same amount of tractive force $F_t$ to break away and move in the direction opposite of the static friction force $F_{SF}$. Accordingly, tractive force $F_t$ is a product of mass m, gravitational acceleration g and the coefficient of static friction $\mu_s$ and can be calculated as follows.

$$F_t=\mu_s*m*g$$

VCM 120 is configured to periodically receive signals from motor 124 indicating the speed and the torque of wheels 130. Thus, when vehicle 100 breaks away and wheels 130 of vehicle 100 start moving, electric motor 124 measures and communicates torque output T, via inverter 122, to VCM 120. Based on a known gear ratio in the gearbox/transmission of vehicle 100 as well as tire radius of wheels 130 and the torque output T, VCM 120 may then calculate the tractive force $F_t$ required for vehicle 100 to break away and move. This calculated tractive force $F_t$ may be used to solve for the unknown mass m at the time vehicle 100 started moving. That is, the unknown mass m can be solved using Equation 1:

$$m = \frac{F_t}{\mu_s * g} \quad \text{(Eq. 1)}$$

where tractive force $F_t$ is calculated using torque output T, the gravitational acceleration g is known, and static friction coefficient $\mu_s$ may be a pre-determined value, for example estimated through experimentation for different combinations of tires and road surfaces.

In various embodiments, vehicle 100 may be starting on an incline having angle θ. In various embodiments, angle θ may be acquired using an incline sensor. In exemplary embodiments, an inertial measurement unit 126 may be coupled to VCM 120. In such embodiments, angle θ may be calculated and/or estimated by VCM 120 based on measurements acquired by an inertial measurement unit (IMU) 126. For example, an IMU inside a crash ECU may provide sensor measurements, which may be utilized in a sensor fusion algorithm to determine angle θ. Because road surfaces may not always be exactly horizontal, taking the incline of the road into consideration (even when it is minimal) may provide more accurate mass estimate for vehicle 100.

While vehicle 100 is resting on the incline, the normal force $F_N$ is given by the following Equation 2:

$$F_N = m*g*\cos θ \quad \text{(Eq.2)}$$

wherein the incline of the road is defined by angle θ. Some amount of static friction prevents vehicle 100 from moving. Taking this static friction into consideration, the amount of tractive force $F_t$ required by vehicle 100 to break away and move is at least the same as normal force $F_N$ scaled by static friction coefficient $\mu_s$. Thus, tractive force $F_t$ is a product of mass m, static friction coefficient $\mu_s$, gravitational acceleration g, and cosine of angle θ. Tractive force $F_t$ may be calculated using torque output τ, gear ratio, and the tire radius of wheels 130. Further, gravitational acceleration is known and static friction coefficient $\mu_s$ may be a pre-determined value, for example estimated through experimentation for different combinations of tires and road surfaces. Finally, angle θ may also be acquired or calculated through one or more sensors. Accordingly, the unknown mass m may be solved through the following Equation 3:

$$m = \frac{F_t}{\mu_s * g * \cos θ} \quad \text{(Eq. 3)}$$

Vehicle In-Motion

When vehicle 100 is already in motion, a system identification (SysID) method may be employed to estimate mass m of vehicle 100. SysID generally uses the input and output signals measured from a system to estimate the values of adjustable parameters in a given model structure. SysID is generally used for identifying system parameters and requires that the inputs to the system are persistently exciting. Stated another way, the inputs desirably will occur or be available with sufficient frequency for the parameter estimation to be adequately accurate. In exemplary embodiments described herein, SysID may be used for estimation of mass of vehicle 100 based on inputs such as tractive force, coefficient of friction, angle of the road on which vehicle 100 is moving, and mass of vehicle 100, and based on output such as velocity of vehicle 100.

In the time domain, mass of vehicle 100 in motion may be determined by the following equation:

$$m\frac{dv(t)}{dt} = F_t(t) - F_{aero} - F_{roll} - F_m \sin θ$$

In the above equation, $F_t$ is the tractive force, $F_{aero}$ is resistive force due to aerodynamic drag, $F_{roll}$ is resistive force due to rolling friction, $F_m$ is the normal force on the road surface, angle θ is the angle of incline that the vehicle is driving on, and dv/dt is the instantaneous difference in velocity v of the vehicle over a given time period. Aerodynamic drag force $F_{aero}$ can be calculated as a product of a constant $C_{aero}$ and velocity. Specifically, constant $C_{aero}$ is calculated from density of air, frontal area of the vehicle and the coefficient of drag. Thus, $$F_{aero} = \frac{1}{2}\rho_{air} A C_d |v|v$$

Further, rolling friction force $F_{roll}$ is calculated as a product of mass m, gravity g, velocity v and rolling friction coefficients $a_{roll}$, $b_{roll}$ and $c_{roll}$. That is, $$F_{roll} = mg(a_{roll} + b_{roll}v + c_{roll}|v|v)$$

Finally, normal force $F_m$ is a product of mass m and gravity g. As seen in the equation, velocity and tractive force are instantaneous quantities that change over the given time period. Thus, the equation can be rewritten as follows:

$$m\dot{v} = F_t - C_{aero}|v|v - mg(a_{roll} + b_{roll}v + c_{roll}|v|v) - mg \sin θ$$

further simplified as $$\dot{v} = \frac{F_t}{m} - ga_{roll} - gb_{roll}v - \left(\frac{C_{aero}}{m} + gc_{roll}\right)|v|v - g\sin θ$$

In exemplary embodiments, a correction factor $C_{corr}$ may be further introduced to consider other external factors that may affect the estimation of mass m.

$$\dot{v} = \frac{F_t}{m} - ga_{roll} - gb_{roll}v - \left(\frac{C_{aero}}{m} + gc_{roll}\right)C_{corr}|v|v - g\sin θ$$

Tractive force $F_t$ in the above equation can be replaced as u(t) denoting instantaneous input force to the system, and velocity v can be replaced as x(t), where x is the state of the system. Accordingly, the general linearization of the equation, with respect to the state and input, can be written as follows:

$$\delta\dot{x}(t) = \frac{\partial \dot{v}}{\partial x}\delta x(t) + \frac{\partial \dot{v}}{\partial u}\delta u(t)$$

Computing the linearization at the equilibrium point ($x_e$, $u_e$), the equation can be further rewritten as follows:

$$\delta\dot{x}(t) = -\left(gb_{roll} + 2v_eC_{corr}\left(\frac{C_{aero}}{m} + gc_{roll}\right)\right)\delta x(t) + \frac{1}{m}\delta u(t)$$

In the above equation, $v_e$ is the velocity at equilibrium point.

Because state x is also the output of the system, the transfer function is defined by the following equation after taking a Laplace transform and arriving at the frequency domain:

$$P(s) = \frac{1/m}{s + \left(gb_{roll} + 2v_eC_{Fac}\left(\frac{C_{aero}}{m} + gc_{roll}\right)\right)} \quad \text{(Eq. 4)}$$

In the above Equation 4, s is the Laplace operator. Tractive force (which is the input) may be measured using torque output from one or more motors 124, and state x (i.e., velocity) can be measured from one or more vehicle 100 speed sensors. All coefficients are known either from modeling or computed empirically on a known vehicle, so the only unknown parameter mass m may then be identified using SysID.

To satisfy the condition of "persistent excitation," the input signal defining tractive force of vehicle 100 desirably occurs with sufficient frequency for accurate parameter estimation. Performing SysID in the frequency domain allows VCM 120 to produce filtered outputs and identify frequency response of system 110 of vehicle 100 having a better characterization of the system model compared to performing SysID in a time domain. When VCM 120 determines that vehicle 100 is already in motion, system 110 may employ SysID to estimate mass of vehicle 100. In exemplary embodiments, VCM 120 may estimate the angle of incline θ of the surface that vehicle 100 is moving on using measurements from IMU 126.

VCM 120 may utilize SysID to estimate a mass of vehicle 100 using Equation 4. That is, VCM 120 receives various input parameters such as tractive force (based on a torque output from motor 124) and is configured to output velocity. In exemplary embodiments, the angle of incline θ of the surface on which vehicle 100 is moving is also one of the input parameters utilized by VCM 120 when performing SysID to estimate mass of vehicle 100. These input and output parameters can then be used in SysID to estimate mass of vehicle 100.

In exemplary embodiments, SysID is performed when vehicle 100 is in motion for at least a persistency of excitation (PE) time period. The PE time period is the amount of time determined sufficient by VCM 120 to reach an acceptable margin of error and remain within that margin for a given time period. In exemplary embodiments, the PE time period may be determined as a product of the smallest switch time, number of bits and switch level in the signal sent to VCM 120. In exemplary embodiments, the acceptable margin of error may be within a range of 0 to 5 percent for a given time period. In exemplary embodiments, this given time period may be between 5 minutes and 20 minutes.

In exemplary embodiments, SysID is performed based on at least one of: 1) pedal inputs from vehicle 100, and 2) predesigned inputs. In exemplary embodiments, SysID may be used when the pedal inputs from vehicle 100 satisfy the "persistency of excitation" condition. Specifically, the pedal inputs are received by VCM 120 and translated into torque commands, and SysID may be used when these torque commands satisfy the "persistency of excitation" condition. When vehicle 100 is in motion, the driver is using accelerator 118 resulting in fluctuation in the velocity at which vehicle 100 is driven over a PE time period. These fluctuations provide various data points for velocity over the PE time period. That is, the pedal input received by VCM 120 translates into torque requests sent to inverter 122 and may determine velocity at which vehicle 100 is driving at any given time. In exemplary embodiments, a torque request sent to inverter 122 is based on the input received by VCM 120 from accelerator 118. VCM 120 may be further configured to determine whether the fluctuation in velocity of vehicle 100 is within a given range over the PE time period. In some exemplary embodiments, the fluctuation in velocity is within a range of 10 miles/hour. Even further, VCM 120 may be configured to determine whether the pedal inputs satisfy the "persistency of excitation" condition. That is, VCM 120 may be configured to determine if the velocity data points received over the PE time period are sufficient for mass estimation.

Further, in such an exemplary embodiment, one of the input parameters received by VCM 120 may be angle of incline θ of the surface on which vehicle 100 is moving. Thus, mass estimation determined using Equation 4 takes the angle of incline θ into consideration for every data point while implementing SysID.

In exemplary embodiments, SysID may be performed by using predesigned inputs. For example, when vehicle 100 is moving at a constant velocity, random binary sequence (PRBS) signals may be utilized to slightly fluctuate vehicle velocity. In such an exemplary embodiment, prior to utilizing PRBS signals, VCM 120 is configured to determine whether it is safe to perform mass estimation. In exemplary embodiments, VCM 120 determines that it is safe to perform mass estimation based on input from a user (such as a driver of vehicle 100). For example, the user may be sent a prompt asking whether it is safe to perform mass estimation. The user responds to the prompt based on the surrounding conditions (such as road incline, road surface, traffic, weather conditions, etc.) of vehicle 100. When the user responds that it is safe to perform mass estimation, PRBS signals may be utilized by vehicle 100 to fluctuate vehicle velocity over a given time period. In exemplary embodiments, the PRBS signals are generated by VCM 120. These PRBS signals ensure that the inputs to the system are persistently exciting to perform SysID.

In exemplary embodiments, memory 140 is configured to store the results of mass estimation. These results may then be utilized by VCM 120 later for additional computation. For example, mass estimation results at a breakaway point computed for vehicle 100 while it was stationary may be stored in memory 140. These results may then be used as a starting point for SysID when vehicle 100 is in motion. In an exemplary embodiment, SysID may be utilized by VCM 120 and the results may be stored in memory 140 to use later. For example, VCM 120 may begin SysID but prior to reaching an acceptable margin of error, the conditions required for "persistency of excitation" may change. At such a time, VCM 120, either through user input or through change in other internal or external factors (such as, change in incline of road, change in the speed limit, weather, traffic, and/or the like) may determine that SysID cannot be performed to a sufficient degree of reliability. Accordingly, in such an example, VCM 120 may store the results of the partial computation in memory 140 that may be retrieved later. At a later time, when VCM 120 determines that "persistency of excitation" conditions are met, SysID may be resumed by using the previously stored results of mass estimation values in memory 140.

In exemplary embodiments, SysID may be performed using a technique of batch estimation. For example, various input and output parameters (i.e tractive force, angle of incline, velocity, etc.) at respective sample points may be received by VCM 120. The parameters at respective sample points are received every sampling period. In exemplary embodiments, the sampling period is 10 milliseconds. These parameters are received and may be stored in memory 140 over an estimation period. This estimation period may be within a range of the sampling period to the PE time period. A value for mass estimation of vehicle 100 may then be computed using the parameters received at the respective sample points during the estimation time period. In exemplary embodiments, the parameters received at the respective sample points and/or the value for mass estimation computed during the estimation time period may be stored in memory 140. These values stored in memory 140 may then be used for additional mass estimation computation at a later time. In exemplary embodiments, this process of computing a mass estimate for vehicle 100 continues in different batches over various estimation periods for the entirety of the PE time period.

In exemplary embodiments, SysID may be performed using a technique of iterative estimation. Utilizing iterative estimation, SysID is performed in real-time when the parameters are received at respective sample points. These sample points may be received every sampling period. In exemplary embodiments, the sampling period is 10 milliseconds. In iterative estimation, a mass estimate value is computed at each sample point. Over the estimation time period, this value converges to a value within the acceptable margin of error, which may be within a range of 0 to 5 percent. This estimation time period may be in a range of 10 milliseconds to the PE time period.

Figure 2A:
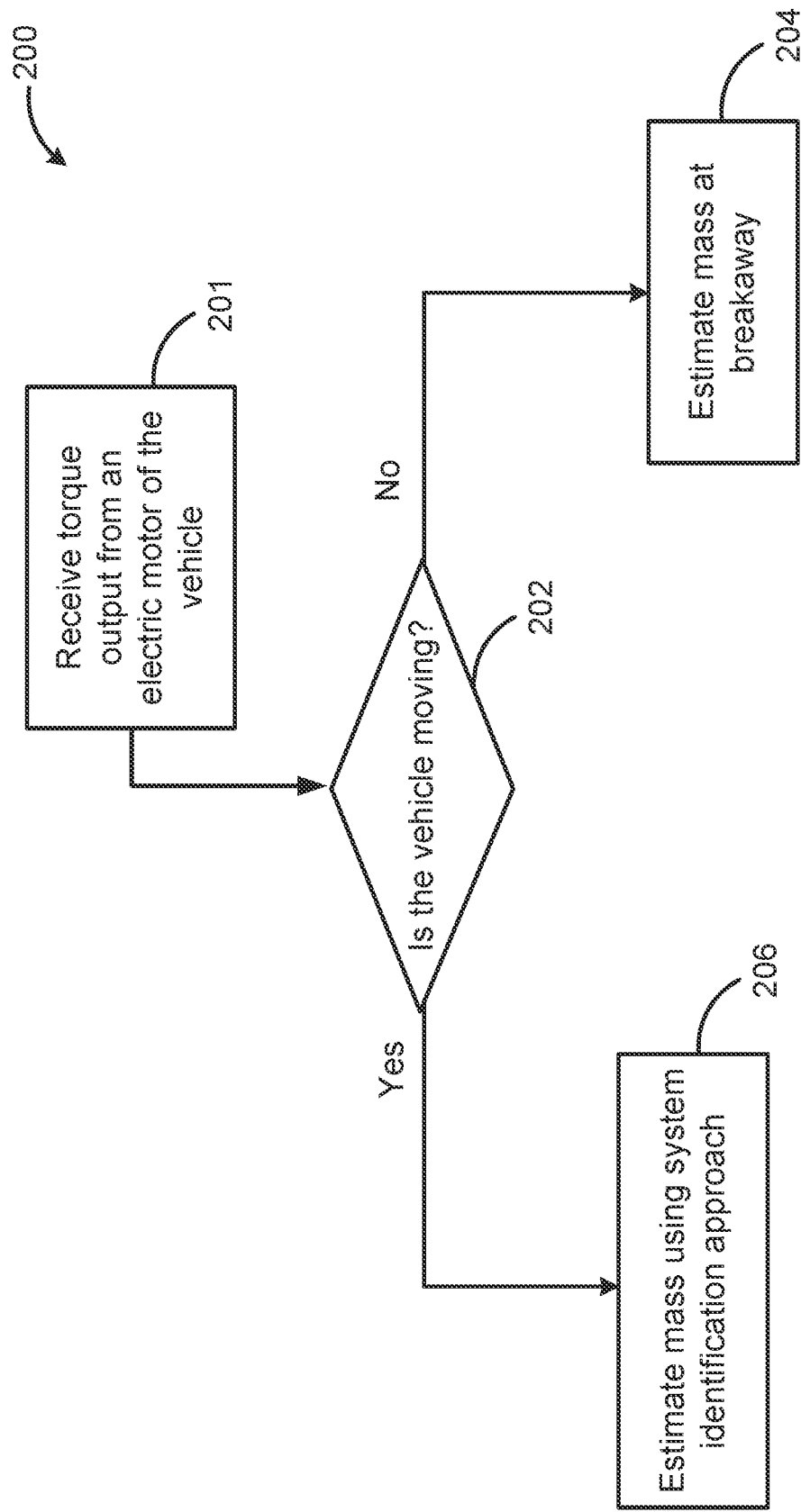
FIGS. 2A and 2B illustrate flow diagrams for a method of mass estimation for an electric vehicle.
Figure 2B:
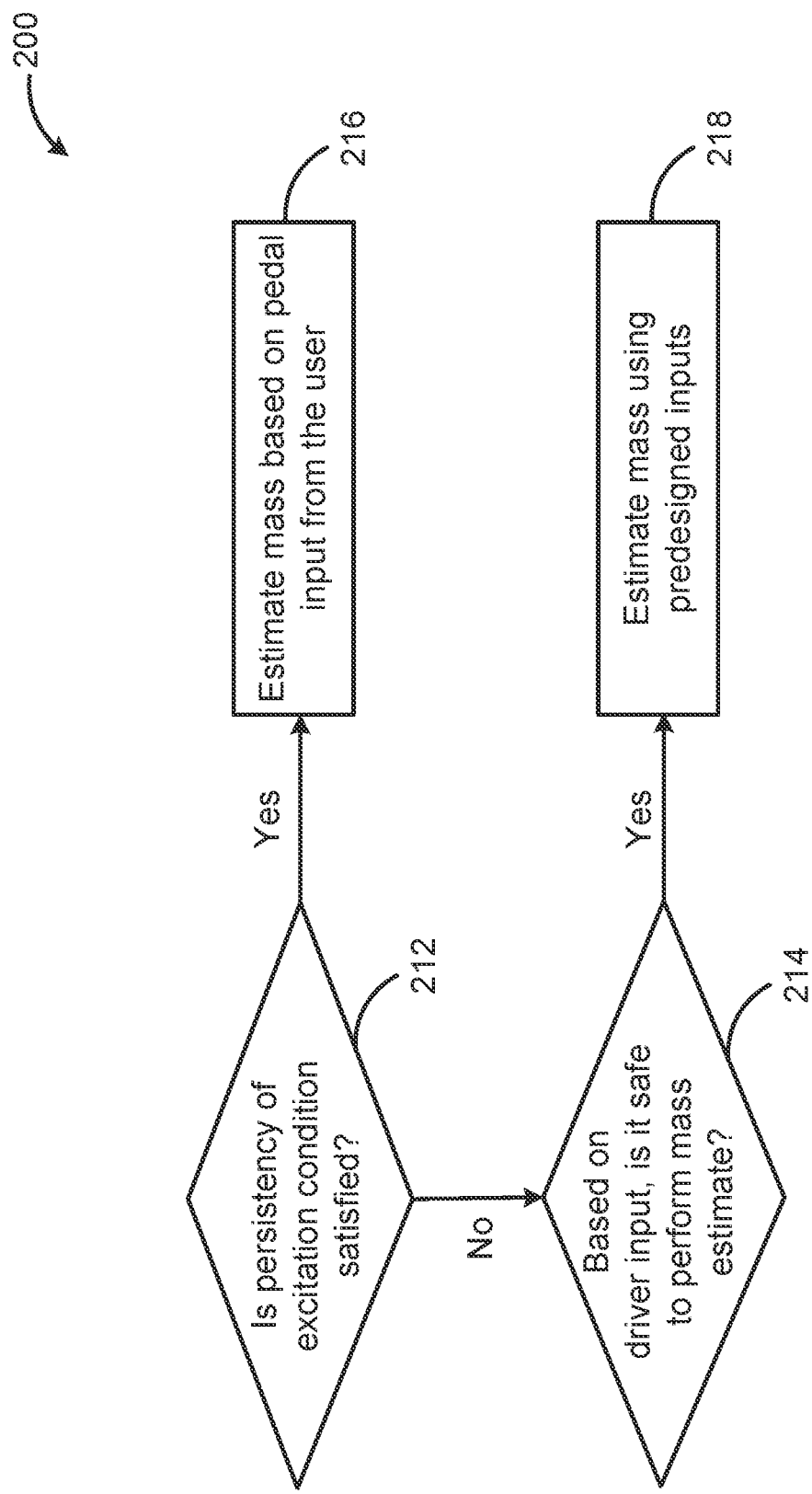

FIGS. 2A-2B are flow diagrams of exemplary embodiments of a method 200 to estimate mass of an electric vehicle (such as vehicle 100). As discussed herein, method 200 is described with respect to examples of vehicle 100 shown in FIG. 1. However, method 200 may apply to other examples of electric vehicles as well.

In the example shown in FIG. 2A, method 200 comprises receiving torque output of one or more wheels of the electric vehicle from an electric motor of the vehicle (step 201). Method 200 further comprises determining if the vehicle is in motion (step 202). When the vehicle is not in motion, method 200 comprises estimating mass at a point of breakaway (step 204). The torque output at the point where the vehicle breaks away and starts moving determines the tractive force needed for the vehicle to move. This value of tractive force along with coefficient of static friction and gravitational acceleration provides an estimate for the mass of the vehicle (Equation 1). In exemplary embodiments, estimating mass at a point of breakaway further comprises estimating an angle of incline (such as angle θ) of the surface on which the vehicle is resting. This angle of incline may be determined based on measurements received from at least one of an incline sensor or an inertial measurement unit.

In exemplary embodiments, method 200 further comprises determining if the vehicle is resting on a horizontal surface. When the vehicle is not resting on a horizontal surface, method 200 further comprises estimating an angle of incline (such as angle θ) of the surface on which the vehicle is situated. In exemplary embodiments of method 200, this angle of incline may be determined based on measurements received from at least one of an incline sensor or an inertial measurement unit.

When the vehicle is in motion, method 200 comprises estimating mass using a system identification approach (step 206). Estimating mass using SysID comprises at least one of utilizing pedal inputs from a user (for example, a driver of the vehicle) over a given time period and injecting predesigned input into a mass estimation system of the vehicle.

FIG. 2B is a flow diagram of one embodiment of step 206 for estimating mass using a system identification approach (step 206). Estimating mass using SysID comprises determining if the persistency of excitation condition is satisfied (step 212). When the persistency of excitation condition is satisfied, method 200 comprises estimating mass based on pedal inputs from a user (such as a driver driving the vehicle) (step 216). When the persistency of excitation condition is not satisfied, method 200 comprises determining, based on user input, if it is safe to perform mass estimation (step 214).

In exemplary embodiments of method 200, estimating mass using a system identification approach comprises performing the system identification approach for at least a persistency of excitation (PE) time period. In exemplary embodiments of method 200, estimating mass based on pedal inputs from a user further comprises sending a torque request to an inverter, such as inverter 122, and determining velocity of the vehicle at any given time. In exemplary embodiments, sending a torque request to the inverter further comprises receiving input from an accelerator (such as accelerator 118).

In exemplary embodiments of method 200, receiving user input comprises sending a message to the user to inquire or otherwise determine if it is safe to perform mass estimation. When the user input indicates that it is not safe to perform mass estimation, method 200 comprises allowing a defined amount of time to pass and repeating method 200 from step 206. In exemplary embodiments of method 200, the defined amount of time allowed to pass is within a range between 5 minutes and 30 minutes before repeating method 200. When the user input indicates that it is safe to perform mass estimation, method 200 comprises estimating mass based on driver input (step 218).

In exemplary embodiments, estimating mass based on driver input comprises injecting random signals, more specifically pseudorandom binary sequences (PRBS) signals to fluctuate vehicle velocity over a given time period. In exemplary embodiments, this given time period is the PE time period.

In exemplary embodiments, method 200 further comprises storing the results of mass estimation in a memory (such as memory 140). In further exemplary embodiments, method 200 further comprises retrieving the results of mass estimation from memory at a later time and resuming process of mass estimation.

Example Embodiments

Example 1 includes a vehicle, comprising: a vehicle control module (VCM); an inverter coupled to the VCM; and an electric motor coupled to the inverter, wherein the electric motor is configured to measure the torque output from one or more wheels of the vehicle, and wherein the VCM is configured to receive the torque output measured by the electric motor and estimate mass of the vehicle based on the received torque output.

Example 2 includes the vehicle of Example 1, further comprising: an inertial measurement unit (IMU) coupled to the VCM, wherein the VCM is configured to estimate an angle of incline on the surface on which the vehicle is situated based on measurements acquired by the IMU.

Example 3 includes the vehicle of any of Examples 1-2, further comprising: wherein the VCM is configured to estimate mass of the vehicle using system identification.

Example 4 includes the vehicle of Example 3, wherein the VCM is configured to perform system identification using predesigned inputs.

Example 5 includes the vehicle of any of Examples 1-4, further comprising a user input device, wherein the VCM is configured to receive data from the user input device, and wherein the VCM is configured to perform system identification using data received from the user input device.

Example 6 includes the vehicle of Example 5, wherein the user input device is an accelerator.

Example 7 includes the vehicle of any of Examples 5 and 6, wherein the user input device is a vehicle head unit (VHU).

Example 8 includes the vehicle of any of Examples 1-7, further comprising an incline sensor coupled to the VCM, wherein the VCM is configured to receive measurements of an angle of incline on which the vehicle is situated.

Example 9 includes a method of estimating mass of an electric vehicle (EV), the method comprising: receiving a torque output of one or more wheels of the EV from an electric motor of the EV; determining if the EV is in motion; and estimating a mass of the EV based on the torque output received from the electric motor, wherein, when the EV is not in motion, the mass is estimated at a point of breakaway based on the torque output at the point of breakaway, wherein, when the EV is in motion, the mass is estimated using a system identification approach based on the torque output received from the electric motor of the EV.

Example 10 includes the method of Example 9, wherein estimating the mass using a system identification approach comprises at least one of: utilizing a pedal input from a user over a persistency of excitation (PE) time period; and injecting a predesigned inputs into a mass estimation system of the EV.

Example 11 includes the method of Example 10, wherein utilizing pedal inputs from a user over the PE time period further comprises: determining whether the pedal inputs from the user satisfy persistency of excitation condition over the PE time period; when the pedal input from the user satisfies the persistency of excitation condition, estimating the mass based the pedal input from the user; and when the pedal input from the user does not satisfy the persistency of excitation condition, estimating the mass based on the predesigned inputs injected into the mass estimation system.

Example 12 includes the method of any of Examples 10-11, wherein injecting predesigned inputs into the mass estimation system further comprises: determining, based on a user input, if it is safe to perform mass estimation for the EV; when the user input indicates that it is not safe to perform mass estimation, allowing a defined amount of time to pass; and when the user input indicates that it is safe to perform mass estimation, injecting the predesigned inputs into the mass estimation system.

Example 13 includes the method of any of Examples 10-12, wherein injecting the predesigned inputs in the mass estimation system further comprises injecting a pseudo random binary sequence (PRBS) signal.

Example 14 includes the method of any of Examples 9-13, wherein estimating mass at the point of breakaway further comprises: determining if a surface upon which the vehicle is positioned is horizontal; and when the surface upon which the vehicle is positioned is not horizontal, determining an angle of incline of the surface on which the vehicle is positioned.

Example 15 includes the method of Example 14, wherein determining the angle of incline further comprises receiving a measurement from at least one of an incline sensor and an inertial measurement unit.

Example 16 includes the method of any of Examples 10-15, wherein estimating mass based on pedal inputs from a user comprises: sending a torque request to an inverter, wherein the inverter is coupled to the electric motor; and determining a velocity of the vehicle at a given time relative to the torque request.

Example 17 includes the method of any of Examples 9-16, wherein estimating mass using a system identification approach comprises receiving an input determining tractive force of the vehicle and a velocity output at equilibrium.

Example 18 includes the method of any of Examples 9-17, further comprising storing results of estimated mass in a memory.

Example 19 includes a non-transitory computer-readable medium having stored thereon instructions that, when executed by one or more processors of a computing device, cause the computing device to perform functions comprising: receiving a torque output of one or more wheels of an EV from an electric motor of the EV; determining if the EV is in motion; and estimating a mass of the EV based on torque output received from the electric motor, wherein, when the EV is not in motion, the mass is estimated at a point of breakaway based on the torque output at the point of breakaway, and wherein, when the EV is in motion, the mass is estimated using system identification approach based on the torque output received from the electric motor of the EV by at least one of: utilizing a pedal input from a user over a persistency of excitation (PE) time period; or injecting a predesigned input into a mass estimation system of the EV.

Example 20 includes the non-transitory computer-readable medium of Example 19, wherein injecting a predesigned input into a mass estimation system of the EV further comprises: determining, based on a user input, if it is safe to perform mass estimation for the EV; when the user input indicates that it is not safe to perform mass estimation, allowing a defined amount of time to pass; and when the user input indicates that it is safe to perform mass estimation, injecting the predesigned inputs into the mass estimation system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of estimating a mass of an electric vehicle (EV), the method comprising:
   receiving a torque output of one or more wheels of the EV from an electric motor of the EV;
   determining if the EV is in motion; and
   estimating the mass of the EV based on the torque output received from the electric motor,
   wherein, when the EV is in motion, the mass is estimated using a system identification approach based on the torque output received from the electric motor of the EV,
   wherein estimating the mass using the system identification approach comprises injecting predesigned inputs into a mass estimation system of the EV, and
   wherein injecting predesigned inputs into the mass estimation system of the EV comprises:
      determining, based on a user input, if it is safe to perform mass estimation for the EV; and
      when the user input indicates that it is safe to perform mass estimation, injecting the predesigned inputs into the mass estimation system.

2. The method of claim 1, wherein, when the user input indicates it is not safe to perform mass estimation, allowing a defined amount of time to pass.

3. The method of claim 1, wherein injecting predesigned inputs into the mass estimation system comprises injecting a pseudo random binary sequence (PRBS) signal.

4. The method of claim 1, further comprising storing results of the mass in a memory.

5. A method of estimating a mass of an electric vehicle (EV), the method comprising:
   receiving a torque output of one or more wheels of the EV from an electric motor of the EV;
   determining if the EV is in motion; and
   estimating the mass of the EV based on the torque output received from the electric motor,
   wherein, when the EV is in motion, the mass is estimated using a system identification approach based on the torque output received from the electric motor of the EV,
   wherein estimating the mass using the system identification approach comprises injecting predesigned inputs into a mass estimation system of the EV, and
   wherein injecting predesigned inputs into the mass estimation system comprises injecting a pseudo random binary sequence (PRBS) signal.

6. A method of estimating a mass of an electric vehicle (EV), the method comprising:
   receiving a torque output of one or more wheels of the EV from an electric motor of the EV;
   determining if the EV is in motion; and
   estimating the mass of the EV based on the torque output received from the electric motor,
   wherein, when the EV is in motion, the mass is estimated using a system identification approach based on the torque output received from the electric motor of the EV,
   wherein estimating the mass using the system identification approach comprises utilizing a pedal input from a user over a persistency of excitation (PE) time period, and
   wherein the PE time period correlates to an amount of time within a margin for error.

7. The method of claim 6, wherein the amount of time is between 5 and 20 minutes and the margin for error is between 0 and 5 percent.

* * * * *